United States Patent [19]
Howard, Jr. et al.

[11] 3,884,633
[45] May 20, 1975

[54] RUST PREVENTION OF CONTAMINATED STEEL

[75] Inventors: Roland Meadows Howard, Jr., Pittsburgh; Richard Roy Webster, Bethel Park, both of Pa.

[73] Assignee: Jones & Laughlin Steel Corporation, Pittsburgh, Pa.

[22] Filed: May 21, 1973

[21] Appl. No.: 361,908

[52] U.S. Cl. .......... 21/2.5 R; 236/44 C; 34/12; 34/16
[51] Int. Cl. .......... C23f 15/00; F26b 7/00
[58] Field of Search ....... 21/2.5 R; 236/44 C; 34/12, 34/15, 16, 27, 30

[56] References Cited
UNITED STATES PATENTS

| | | | |
|---|---|---|---|
| 2,156,357 | 5/1939 | Simpson | 21/2.5 UX |
| 2,160,831 | 6/1939 | Colby et al | 21/2.5 UX |
| 2,746,684 | 5/1956 | Colvin et al. | 236/44 A |
| 2,974,870 | 3/1961 | Pitts | 236/44 C |

OTHER PUBLICATIONS

Corrosion Abstracts, v. 5, p. 475 (1966).
Evans, *The Corrosion & Oxidation of Metals*, Arnold Publishers, London (1970), pp. 486–487, 495–499, 529–531.
Uhlig, *The Corrosion Handbook*, Wiley & Sons, N.Y. (1948), pg. 917.

Primary Examiner—Morris O. Wolk
Assistant Examiner—Timothy W. Hagan
Attorney, Agent, or Firm—Gerald K. White; T. A. Zalenski

[57] ABSTRACT

The rusting of steel surfaces which have been contaminated by deliquescent compounds is prevented by maintaining the contaminated steel under controlled conditions of relative humidity and temperature.

6 Claims, 3 Drawing Figures

RUST PREVENTION OF CONTAMINATED STEEL

Our invention, in an overall sense, is based upon our discovery that steel surfaces which have been contaminated with rust-causing deliquescent compounds and exposed to ambient conditions of relative humidity and temperature which cause rusting can be protected from rusting through the expedient of placing or storing the contaminated steel under controlled conditions of ambient relative humidity, steel temperature, and ambient temperature. Such controlled conditions also do not significantly influence the metallurgical characteristics of the steel. The requisite controlled conditions have been determined through the use of experimental techniques which are described in a latter portion of the disclosure. We have also discovered that it is advantageous to maintain the contaminated steel surface at a temperature which is at least sufficient to cause the deliquescent compound to become dehydrated prior to placing the steel under the requisite controlled environment.

It is thus an object of our invention to provide a method for preventing the occurrance of rust on steel surfaces during storage of the material.

It is another object of our invention to provide an effective method of preventing the initiation of rust prior to placing the steel in storage.

It is a further objective of our invention to provide a technique that will enable one to determine the conditions of relative humidity and temperature that prevent the formation of rust upon the surface of steel bodies which are contaminated with deliquescent compounds. These and other objects and advantages of our invention will become more apparent from the following description thereof.

The in-process rusting of cold rolled and annealed steel coils during storage is a problem that has continually plagued the steel industry. This problem has resulted in the scrapping of relatively large quantities of steel. When it is considered that very large tonnages of steel are processed on a yearly basis, it may be readily seen that any solution which would minimize or eliminate this problem is of significant economic worth.

Although the prevention of the rusting of steel has been the subject of prior art activity, for example, U.S. Patents 2,160,831 and 2,746,684, such patents are not directed toward a solution of our problem and, hence, do not appear to prevent rusting in the manner of our invention.

Figure 1:
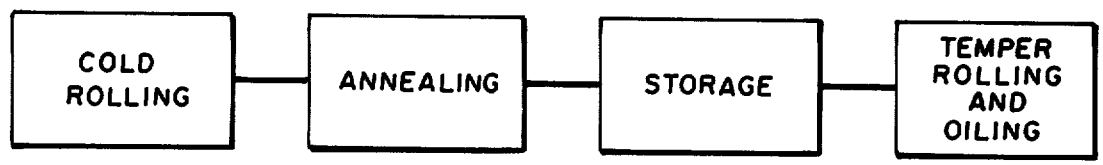
FIG. 1 is a flow diagram which illustrates a typical processing sequence in which the instant invention can be utilized.

As may be seen from FIG. 1, low carbon steel sheet or strip coils are conventionally produced by a combination of steps which include cold rolling, annealing, and temper rolling and oiling. As is known in the art, semifinished steel coils are generally stored in the annealed condition prior to shipment. Storage times vary greatly but may be as long as several months, depending upon customer delivery dates, scheduling requirements, etc. The annealed condition is selected for storage because this is the last point in its processing where the product can be stored for a significant length of time without incurring a downgrading of product properties. In other words, the metallurgical characteristics of the steel product remain substantially stable.

Figure 2:
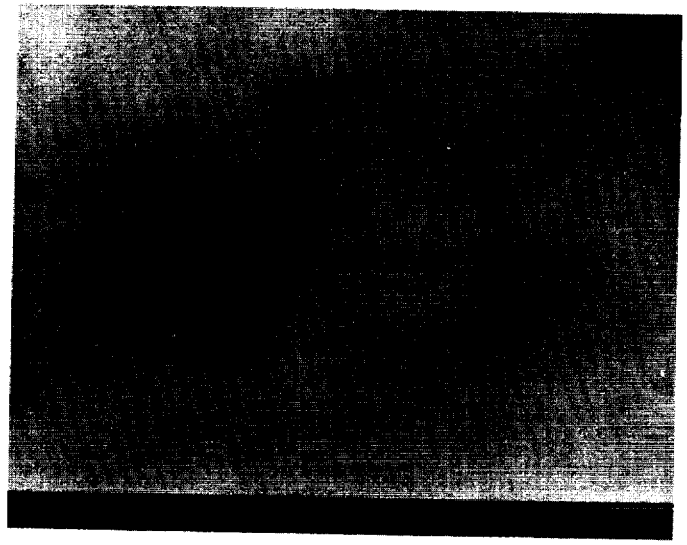
FIG. 2 is a photograph of a typical steel surface upon which speckled rust has occurred.

The type of rusting that occurs during storage is termed in the art as speckled rust. The rust spots are generally circular in shape and occur either in a narrow, well-defined band which extends the full length of the steel body or in a wide, ill-defined band. FIG. 2 depicts a typical form of speckled rust.

The occurrence of speckled rust is believed to be caused by the presence of deliquescent compounds on the steel surface. These compounds have been identified as chlorides and sulfates of sodium, calcium, and magnesium which absorb moisture from the atmosphere and subsequently act as rust nucleants. The speckled rust film then grows from the contaminate nucleation site. The contaminates are believed to originate during the cold rolling operation from rolling oil emulsions. To illustrate this point, Table 1 sets forth typical incidences of various chlorides and sulfates in speckled rusted areas and adjacent non-rusted areas.

TABLE 1

ANALYSIS OF CONTAMINANTS FOUND IN SPECKLED RUST AND ADJACENT NON-RUSTED AREAS

| | Concentration of Contaminants ($\mu g/in^2$) | | | | |
|---|---|---|---|---|---|
| | Cl- | SO$_4$ | Na | Mg | Ca |
| Speckled Rust Areas | 4.9 | 2.4 | 20 | 14 | 2.7 |
| | 3.8 | 1.4 | 32 | 20 | 2.0 |
| | 4.2 | 1.4 | 40 | 15 | 6.0 |
| | 6.3 | 2.8 | 27 | 25 | 9.7 |
| | 6.3 | 2.4 | 29 | 32 | 7.2 |
| | 5.4 | 1.9 | 42 | 16 | 8.4 |
| | 6.3 | 3.0 | 50 | 19 | 9.3 |
| | 5.8 | 1.4 | 36 | 22 | 8.7 |
| Average | 5.4 | 2.1 | 34 | 20 | 6.8 |
| Non-Rusted Areas | 1.4 | 0.3 | 11 | 9 | 1.5 |
| | 1.0 | 0.2 | 15 | 6 | 1.2 |
| | 0.7 | 0.2 | 13 | 1 | 3.0 |
| | 0.6 | 0.2 | 12 | 1 | 3.6 |
| | 0.7 | 0.3 | 15 | 5 | 2.2 |
| | 0.7 | 0.4 | 12 | 3 | 1.7 |
| | 1.1 | 0.4 | 9 | 2 | 1.5 |
| | 1.2 | 0.3 | 12 | 2 | 0.9 |
| Average | 0.9 | 0.3 | 12 | 4 | 2.0 |

In order to evaluate the effect of relative humidity and temperature upon typical surface conditions which occur for annealed cold rolled steel, samples were prepared in the as-received, cathodically cleaned, and contaminated conditions. The as-received condition samples were obtained from actual in-process material. Additional as-received samples were cathodically cleaned or intentionally contaminated to provide the other samples. The samples were placed in an environmental chamber under various combinations of relative humidity and temperature. Periodic visual evaluations were made of all samples after 1, 4, 6½, and 8 weeks of storage. The results of the evaluation are listed in Table 2.

TABLE 2

EVALUATION OF BUNDLES FOR THE FOUR INSPECTION PERIODS

| Steel Condition | 70°F— 30% R. H. Weeks 1 4 6½ | 8 | 85°F— 85% R. H. Weeks 1 4 6½ | 8 | 110°F— 8% R. H. Weeks 1 4 6½ | 8 | 110°F— 15% R. H. Weeks 1 4 6½ | 8 | 110°F— 30% R. H. Weeks 1 4 6½ | 8 |
|---|---|---|---|---|---|---|---|---|---|---|
| As-received | O a a | a | b c c | — | O O O | O | O O O | O | O O O | a |
| Cathodically Cleaned | O O O | O | a a b | b | O O O | O | O O O | O | O O O | O |
| Chloride Contaminated (Aqueous 10%)[1] | b c c | — | c c — | — | a a a | a | a a a | a | a b b | b |
| Chloride Contaminated (Dry)[2] | b c — | — | c c — | — | O O O | O | O O O | O | c c — | — |
| Sulfate Contaminated (Aqueous 10%)[3] | b b b | b | b c — | — | O O O | O | O O O | O | a a a | a |
| Sulfates Contaminated (Dry)[4] | a a b | b | c c — | — | O O O | O | O O O | O | O O a | a |

[1] stained
[2] not dissolved in 110°F—8% & 110°F—15%
[3] stained
[4] totally dissolved in 85°F—85%; partially dissolved in 70°F—30%

Key:
O = No rust
a = 0 to 1% of surface area rusted
b = 1 to 5% of surface area rusted
c = >5% of surface area rusted
— = discarded due to excessive rusting It is important to note that the most severe contaminant that has been associated with speckled rust, calcium chloride, did not produce rust at 110°F. under 8 and 15 percent relative humidity conditions respectively, when applied dry. However, some staining did result from the aqueous calcium chloride contaminant.

Gradient strip tests were also conducted for various ambient relative humidity and strip temperature combinations. The apparatus used to conduct these tests, comprised a 20-mil thick steel strip of varying width. Due to the varying width, a temperature gradient could be developed along the length of the strip by resistance heating. The strip ends were used as electrode contact areas. A 60-cycle power source eliminated possible direct current electro-chemical effects. Strip temperatures were measured by thermocouples which were welded to the bottom surface of the strip at appropriate locations. The gradient strip apparatus was placed in a sealed container and humidity control was effected by the entry of air which had been bubbled through water. A range of ambient relative humidities from 15 to 95 percent was available using the above procedure.

Upon obtaining the desired temperature gradient, the contaminants to be investigated were applied along the centerline of the strip. After reaching equilibrium conditions, a visual examination was made to determine which portion of the contaminant (deliquescent compounds) had not dissolved. By this procedure, the strip temperature above which the contaminant does not dissolve at a particular ambient relative humidity level was determined. Tests revealed that rusting occurred only (and always) over the strip portion in which the contaminant was dissolved.

Figure 3:
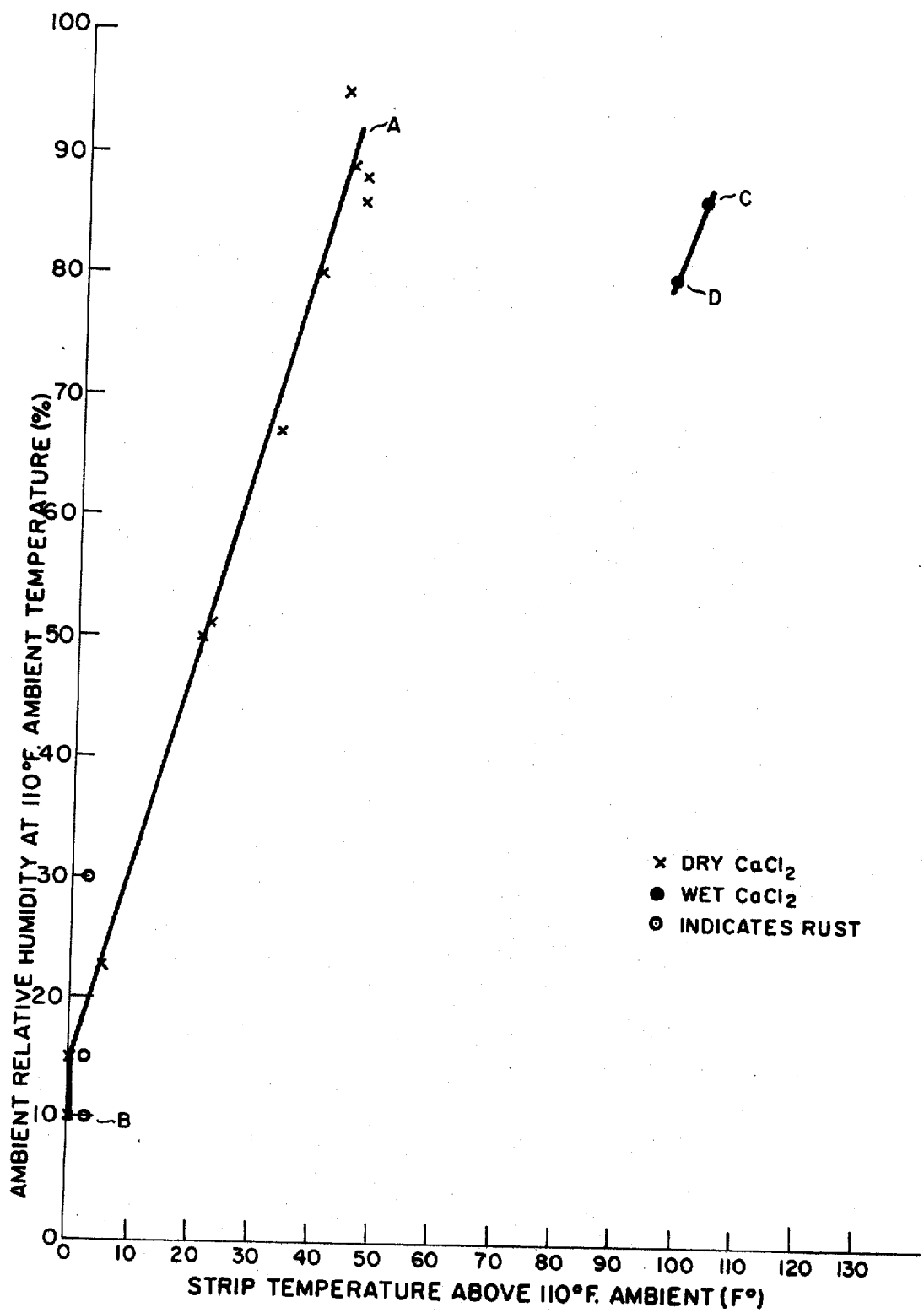
FIG. 3 represents a summary of test results for a low carbon steel in which the relationship between ambient relative humidity and strip temperature which will cause or prevent speckled rust for a given ambient temperature is depicted. The area to the right of the curves represent a combination of ambient relative humidity and strip temperature which will prevent the occurrence of speckled rust.

Several contaminants were examined under both wet and dry applications. It was determined that calcium chloride required the highest temperatures to prohibit rust. A summary of conditions in which relationships were obtained between conditions of ambient relative humidity and strip temperature which prevent and cause rust, are illustrated in FIG. 3. This data represents the results of both environmental chamber and gradient strip testing. The ambient temperature for these trials was 110°F. Of course, all testing was accomplished in an atmospheric environment of ordinary air.

It is further pointed out that the terms "ambient relative humidity" and "ambient temperature" are intended to refer to the relative humidity and temperature of the atmospheric environment which surrounds a given body. On the other hand, the term "strip temperature" or "steel body temperature" refers to the actual temperature at the surface of the strip or body. Obviously, the strip temperature may be of a different value than the ambient temperature. Thus, as may be observed from FIG. 3, there are numerous data points which represent strip or steel body temperatures which were higher than the ambient temperature. As is also apparent from FIG. 3, it is necessary to utilize a strip temperature which is higher than the ambient temperature in order to prevent rusting under certain conditions of ambient relative humidity.

Over the investigated range, the variables exhibit a substantially linear relationship for the most extensively tested compound, dry $CaCl_2$. Curves A-B and C-D which separate rusting and non-rusting parameter combinations are characterized by the relationship that strip temperature increases in a linear fashion with increasing ambient relative humidity. Wet additions of $CaCl_2$ were possible only under high relative humidity because their presence causes this condition. Slight staining resulted in some instances, but no continued rusting occurred at 210°F. However, about a 60°F. higher temperature was required at 85% ambient relative humidity to dry the $CaCl_2$ rather than to merely prevent its dissolution. Relatively weak concentrations (10 to 11 $\mu$ gm/in$^2$) were applied but these samples always resulted in staining for both slow and fast drying rates. As could be expected, cleaned steel was more resistant to rust than uncleaned steel.

We consider that the above described tests indicate that for a given ambient temperature, after annealing, the steel should not be permitted to fall within an ambient relative humidity strip temperature condition where deliquescent compounds would be liquefied. Otherwise, the steel would require reheating to a much higher temperature to arrest rusting, and, in any event, rust staining would occur.

While the curve depicted by FIG. 3 illustrates the particular conditions of ambient relative humidity and strip temperature that will cause and not cause rusting at an ambient temperature of 110°F., our invention is clearly not limited to ambient temperatures in the proximity of 110°F. We believe that our discovered relationship between ambient humidity and strip or steel body temperature is equally applicable at other ambient temperatures which are considerably above and below 110°F. Such temperatures obviously would include room temperature. By following our above disclosed experimental procedure, one could easily determine the ambient relative humidity and strip temperature conditions under which a steel would rust at any given ambient temperature and then utilize such data to perform our process under any desired ambient temperature.

Based upon the above test results, it was determined that controlled conditions of ambient relative humidity and strip temperature for a given ambient temperature present a technically feasible method of solving the problem of speckled rust. The safe conditions for a given steel would be to the right of the ambient relative humidity strip temperature curves for both wet (Curve C-D) and dry (Curve A-B) compounds. While it is technically feasible to protect either wet or dry contaminated steel surfaces, it is a preferred embodiment of our invention to store dried contaminants due to the resultant higher costs associated in obtaining the requisite humidity-temperature conditions for wet contaminants.

Thus, it is preferred in the practice of our invention to introduce the steel into storage at a temperature that is at least sufficient to cause the deliquescent compound to be in the dehydrated condition. Typically, temperatures of 160°F. or higher will perform this function. It is further preferred to store the steel at the lower portion of the curve in order to prevent undue discomfort to operating personnel and to minimize heating costs associated with the storage installation. Thus, storage at about 110°F. under a low relative humidity in the vicinity of 20 percent or less is desirable.

Upon completion of the annealing operation, the steel may be transported to the storage area in containers which are heated by conventional means, e.g., electrically or thermally. The steel is not heated to a temperature which would significantly influence its metallurgical characteristics. With regard to the steel storage portion of our invention, a variety of apparatus are suitable for maintaining the requisite environmental conditions. For example, the steel may be placed in a heated building or room in which the ambient relative humidity is controlled in a conventional manner. The steel could also be placed under covers in which the environment is controlled. When required, the steel strip may be heated above the ambient temperature by conventional techniques which are known in the art. In order to maximize the benefits of our invention, subsequent processing after storage should be timed to continue rust inhibition. This is because the contaminated steel can rust in a time span of only a few hours under severe conditions. Thus, it may readily be seen that processing and transportation times, after storage, should be kept at a minimum. The instant invention is also applicable to a wide variety of steels and metallurgical conditions in which the problem of speckled rust is prevalent. The instant method is of particular utility in the storage of cold rolled annealed, low, medium, and high carbon steel coils of sheet and strip.

We claim:

1. A method of preventing the substantial occurrence of rust on steel surfaces comprising the steps of: taking a steel body having a surface contaminated by deliquescent compounds and which is exposed to ambient conditions of relative humidity and temperature that are sufficient to cause rust; and placing and maintaining said steel body under controlled conditions of ambient relative humidity, steel body temperature and ambient temperature which substantially prevent the occurrence of speckled rust and do not significantly influence the metallurgical characteristics of the steel body, said controlled conditions being established and maintained by controlling said ambient relative humidity and temperature and heating and maintaining said steel body to a temperature greater than ambient temperature, wherein said controlled condition of ambient relative humidity ranges from about 20 to about 95 percent, said steel body temperature ranges from above about 110°F to about 160°F, and said ambient temperature is about 110°F; said controlled conditions of ambient relative humidity and steel body temperature being further defined by being located in the area to the right of curve A-B in FIG. 3.

2. A method of preventing the substantial occurrence of rust on steel surfaces as recited in claim 1, wherein the deliquescent compounds comprise chlorides and sulfates.

3. A method of preventing the substantial occurrence of rust on steel surfaces as recited in claim 1, wherein said contaminated steel body is in the annealed condition.

4. A method of preventing the substantial occurrence of rust on steel surfaces as recited in claim 1, wherein said contaminated steel body is cleaned prior to placing said body under said controlled conditions of ambient relative humidity, steel body temperature and ambient temperature.

5. A method of preventing the substantial occurrence of rust on steel surfaces as recited in claim 1, which method further comprises heating said contaminated steel body to a temperature which is at least sufficient to dehydrate the deliquescent compounds prior to placing said contaminated steel body under said controlled conditions of ambient relative humidity, steel body temperature and ambient temperature.

6. A method of preventing the substantial occurrence of rust on steel surfaces as recited in claim 5, wherein the heating temperature is at least about 160°F.

* * * * *